United States Patent
Britsch

(10) Patent No.: US 9,002,748 B2
(45) Date of Patent: Apr. 7, 2015

(54) METHOD FOR SECURING IP CONNECTIONS FOR NETWORK OPERATOR COMBINATORY CONNECTIONS

(75) Inventor: Matthias Britsch, Königswinter (DE)

(73) Assignee: T-Mobile International AG, Bonn (DE)

( * ) Notice: Subject to any disclaimer, the term of this patent is extended or adjusted under 35 U.S.C. 154(b) by 1047 days.

(21) Appl. No.: 12/302,630

(22) PCT Filed: May 25, 2007

(86) PCT No.: PCT/EP2007/004657
§ 371 (c)(1),
(2), (4) Date: Jun. 29, 2009

(87) PCT Pub. No.: WO2007/137770
PCT Pub. Date: Dec. 6, 2007

(65) Prior Publication Data
US 2010/0030694 A1 Feb. 4, 2010

(30) Foreign Application Priority Data
Jun. 1, 2006 (DE) .......................... 10 2006 025 603

(51) Int. Cl.
G06Q 99/00 (2006.01)
H04L 29/06 (2006.01)
G06Q 20/38 (2012.01)

(52) U.S. Cl.
CPC ............ H04L 63/04 (2013.01); *G06Q 2220/10* (2013.01); *G06Q 20/382* (2013.01); H04L 63/126 (2013.01)

(58) Field of Classification Search
USPC ............................... 705/50, 64; 370/352, 474
See application file for complete search history.

(56) References Cited

U.S. PATENT DOCUMENTS

| | | | | |
|---|---|---|---|---|
| 7,092,385 | B2 * | 8/2006 | Gallant et al. | 370/352 |
| 7,701,974 | B2 * | 4/2010 | Mayer et al. | 370/474 |
| 7,739,196 | B2 * | 6/2010 | Gallant et al. | 705/52 |
| 2003/0097584 | A1 * | 5/2003 | Haukka et al. | 713/200 |
| 2003/0217165 | A1 | 11/2003 | Buch et al. | |
| 2005/0083974 | A1 * | 4/2005 | Mayer et al. | 370/474 |
| 2005/0220078 | A1 | 10/2005 | Luken | |
| 2005/0268328 | A1 | 12/2005 | Corliano | |
| 2006/0239253 | A1 * | 10/2006 | Gallant et al. | 370/352 |

FOREIGN PATENT DOCUMENTS

DE 101 17 309 4/2003
EP 1 313 287 5/2003

OTHER PUBLICATIONS (http://datatracker.ietf.org/doc/rfc3261/, SIP: Session Initiated Protocol, 343 pages, The Internet Society, Jun. 2002).*

* cited by examiner

*Primary Examiner* — James D Nigh
(74) *Attorney, Agent, or Firm* — Faegre Baker Daniels LLP

(57) ABSTRACT

The invention relates to a method for securing IP connections with a combinatory connection of a communication network of a first network operator with a communication network of at least one second network operator using the Session Initiation Protocol, SIP. This method is based on the fact that portions of an SIP message, but at least the information necessary for the combinatory connection of the networks, is transmitted in encrypted form between a transmission channel of the first network operator and a reception channel of the second network operator.

23 Claims, 4 Drawing Sheets

```
INVITE sip:1234@192.168.1.1 SIP/2.0
Via: SIP/2.0/UDP 192.168.1.2
CSeq: 799 INVITE
To: <sip:1234@192.168.1.1>
Content-Type: application/sdp
From: "Bob" <sip:66@192.168.1.1>;tag=64ACEA4F
Call-ID: 1219380128@192.168.1.2
Subject: Important Call
Content-Length: 183
User-Agent: KPhone/3.11
Contact: "Bob" <sip:66@192.168.1.2;transport=udp>
```
HEADER

```
v=0
o=username 0 0 IN IP4 192.168.1.2
s=The Funky Flow
c=IN IP4 192.168.1.2
t=0 0
m=audio 32820 RTP/AVP 0 97 3
a=rtpmap:0 PCMU/8000
a=rtpmap:3 GSM/8000
a=rtpmap:97 iLBC/8000
```
BODY Figure 1 : SIP-Request

```
SIP/2.0 200 OK
Via: SIP/2.0/UDP 192.168.1.2;branch=z9hG4bK51604
From: <sip:66@192.168.1.1>;tag=as668fc20b
CSeq: 102 NOTIFY
Call-ID: 1921196771@192.168.1.2
To: "Bob" <sip:66@192.168.1.2>;tag=3DA82C86
Content-Length: 0
User-Agent: kphone/4.0
Contact: "Bob" <sip:66@192.168.1.2;transport=udp>
```

Figure 2 : SIP-Response

METHOD FOR SECURING IP CONNECTIONS FOR NETWORK OPERATOR COMBINATORY CONNECTIONS

Cross-Reference to Related Application

This application is related to and claims the benefit under 35 U.S.C. §119 and 35 U.S.C. §365 of International Application No. PCT/EP2007/004657, filed May 25, 2007.

The invention is regarding a method for securing IP connections for network operator interconnections.

Normally, connection and access based fee collection models are used on the internet. Therefore, the user normally pays for the access and for incoming or outgoing messages. Thus, the service providers do not need to bill each other since in each case the provider is paid by its own respective customer.

In the world of telephone the picture is totally different. Here it is customary that the caller pays; whereby this model has been established world wide as the customary model. In this model the initiator of the connection is billed by his provider and all other providers, all the way to the user on the other end, need to have a billing relationship established with the provider that is initiating the call. This is the case for all types of services: Access, language, generic connection, messages and mere services.

With the merging of the two worlds of telephone and internet the "caller pays" model needs to be introduced into the internet as well, however, until now the technical foundations for such a method have neither been described nor implemented in the field of internet protocols.

The foundation of relevant billing information is the identification of the partner and the subsequent authorization.

The most widely spread protocol for signaling and message sending in the internet is SIP (Session Initiation Protocol). SIP is a signaling protocol for the establishing, modification and ending of sessions between two or more communication partners.

The text oriented protocol is based on HTTP and can transmit signaling data per TCP of UDP via IP networks. Hereby it is the basis for real-time VoIP, video telephone, and multimedia services. SIP is the foundation for connections that are made between cell phone users via an IP network. This makes cost effective communication forms possible such as push to talk over cellular. SIP is defined in the RFCs 3261-3265.

In SIP agent, proxy server, redirect server and the registrar are defined. SIP is based on a combined client/server architecture. The client is the user agent (UAC), which initiates a SIP requests, that is, it initializes calls. The server is the user agent server (UAS) which handles SIP requests and sends SIP responses (answers), that is, it connects or receives the calls. A back-to-back user agent (B2BUA) is an application that functions as a mediator between two users; however, it appears to both users as final point. For the processing of session requests it serves at the same time as UAS/UAC. SIP uses the transport protocols TCP and UDP for the transmission. The exchange of data packets follows the logic of IP applications. The users are addressed with URL and DNS. Thus the SIP telephony can be implemented in browser environments and web services.

The services that are offered by SIP are:
User localizing: Determination of final system which is used for the applied communication.
Call establishing: Establishing of connection as well as determination of connection parameters.
Availability check: Check if the called on party is available and willing to accept an incoming call.
Call handling: The transfer and set-up of connections.

The SIP protocol will also be used by the next generation of networks which are currently standardizes by 3GPP, ETSI and ITU-T.

The FIGS. 1 and 2 are showing the built-up of SIP messages. Each message consists of a first line which indicates the massage type followed by the rest of the message headers and the massage body. Thereby there are two message types: Requests and responses. Requests serve the purpose to initiate or to inform the receiver of something. By means of the responses the reception of the request is verified and the status of processing is communicated.

A typical SIP request is shown in FIG. 1. The first line contains the message type—in this case an INVITE request. This serves the purpose to open up a session. Via fields indicate the way by which the SIP responses are to be routed later on.

"From" and "To" serve the purpose to specify the sender and recipient of the message (compare to e-mail). The messages that belong to the same call can be identified via the call ID. The CSeq indicates the sequence of the requests.

By way of the contact field the sender indicates where he expects the answers of the receiver. The other headers are of minor importance. Header and body are separated from each other by a blank line. Among other things the body of an INVITE request contains the in SDP encoded description of the media types that are supported by the sender. In this example the end device supports, for example, the audiocodecs PCM law, GSM and iLBC. All additional requests are set up in similar form. To these belong ACK, BYE, CANCEL, and REGISTER.

Each SIP request, except for ACK, has to be answered by a suitable response. Except for the first line the set-up of the response is similar to the set-up of a request. In the example of FIG. 2 the first line contains the SIP version, a reply code (which is set up similarly to a HTTP, compare table 1) and an explanation text.

TABLE 1

SIP reply codes

| Code | Meaning |
|------|---------|
| 1xx  | Provisional. The request was received and is now being processed. |
| 2xx  | Success. The inquiry was successfully received and processed. |
| 3xx  | Redirection. The call was redirected to another server. |
| 4xx  | Client error. An error has occurred on the side of the client. |
| 5xx  | Server error. An error has occurred on the side of the server. |
| 6xx. | Global failure. The inquiry cannot be performed by any server. |

SIP was designed for the internet and contains no authentication by servers, neither one-ways nor two-ways. All described network standards will make use of servers, in form of proxy servers, registrar servers or B2BUAs. Network interconnections will be implemented in form of connection between those servers.

US 2005/083974 discloses a method for the processing of routing information in IP connections for an interconnection of a communication network of a first network operator with a communication network of at least one second network operator, using the Session Initiation Protocol (SIP), where the routing information is replaced by manipulated routing information and then is transmitted in encrypted form.

EP 1 313 287 A2 describes a method to protect confidentiality of a SIP message where a temporary identity index is produced for the message which is assigned to the sender/recipient pair and by means of which they can identify the message.

It is the object of the invention to present a method for the securing of IP connections for network interconnections so that, for example, the initiator of telecommunication services with IP connections, in particular with IP telephony (also called "Voice over IP") can be billed.

The object is addressed according to the invention by a method with the characteristics of patent claim 1.

Preferred embodiments and additional advantageous characteristics of the invention are provided in the sub claims.

The presented invention describes a way in which existing internet protocols can be combined with new methods in order to set up such an identification and authorization method for billing and for all other tasks (which require a guaranteed identification of the partner) which are relevant for the interconnection, mainly for communication termination but not limited to it.

The invention is based on the use of a pair of keys, one public key and one private key for the authentications between a transmission channel and a reception channel. Additionally, this encryption can be supplemented by identification characteristics of the key which are only known to the involved parties and which permit the use of various keys.

Several embodiments of the invention are now described with the help of the illustrated figures.

FIG. 1 describes the set-up of a SIP request message;

FIG. 2 describes the set-up of a SIP response message;

Figure 3:
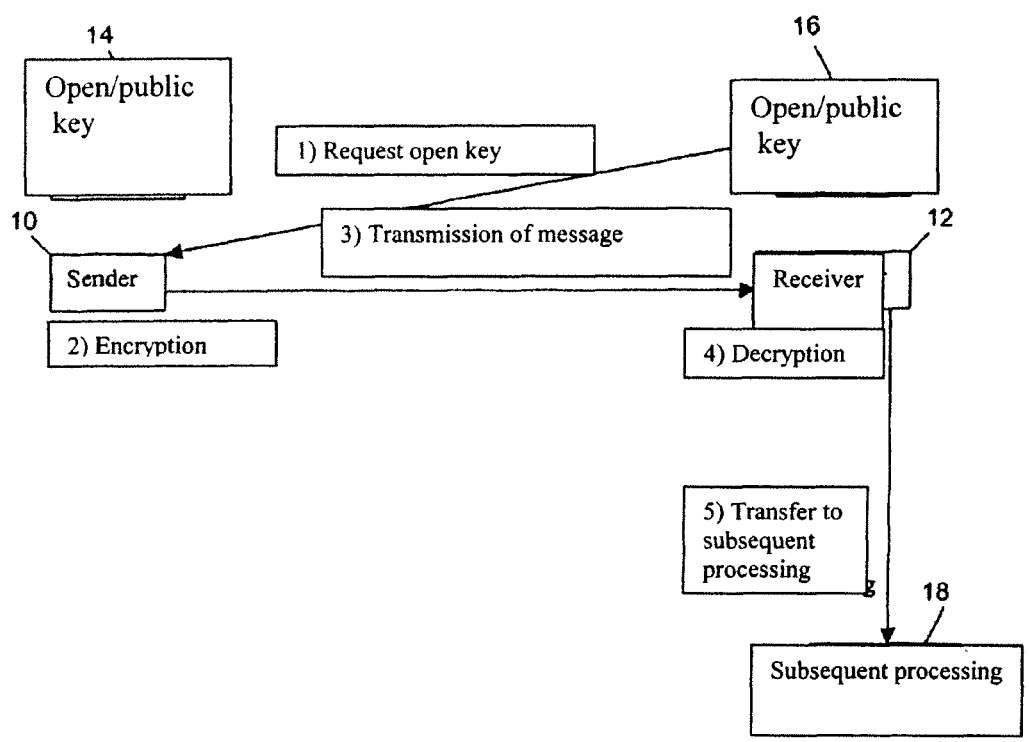
FIG. 3 shows the involved entities and the communication flow in the case of a fundamental mechanism of the method according to the invention.

Illustrated in FIG. 3 is the basic mechanism for the authentication with the use of the pair of keys with one public and one private key, as they are normally used for encryption in the context of a secured transport layer (TLS), for example, SSL.

Between the transmission channel 10 and the reception channel 12 message transmission is to occur. The transmission channel 10 as well as the reception channel 12 are possessing a public as well as a private pair of keys 14 and 16. The mechanism is based on a public and a private key, whereby the public key of the pair of keys 16 of the reception channel 12 is identified (for example, downloaded from a data bank) by the transmission channel 10 which is setting up the connection (step 1). The public key 16 is used to encrypt the message (step 2). The encryption is guaranteed in that only the owner of the corresponding private key, that is the reception channel 12, can decrypt the message again.

Although SIP contains messages to encrypt communication that is also based on public/private pairs of keys (for example, the use of S-MIME) these are not suitable for the identification and authentication of SIP servers since the protocol of these mechanisms is intended for the use of signaling points.

Thus, according to the invention a public/private pair of keys 14 and 16 is used in order to encrypt the communication only at a certain section of the communication flow: Between two channels (servers) 10 or 12 which belong to two different network domains. This should not exclude that an additional server is located in the path between the encrypted and decrypted servers 10 and 12, respectively. Therefore, it needs to be taken into consideration that only non-mandatory parts of the message headers of the SIP message are to be encrypted and those that are not used for routing.

When a SIP message arrives the sending server of an encrypted section can compare the target domain with a list of domains by partners and in the case of a positive result it can use the encrypting mechanism.

If it is not made available differently the transmission channel 10 determines the public key of the target or reception channel (domain) 12 by means of, for example, configuration, manual generation, an external process, or downloaded by means of an external process. If the SIP message or the message body is already encrypted, for example, by S-MIME and if it is a SIP request, the mechanism encrypts one of the non-encrypted headers, hereby the Via header is an option.

If the message is a SIP response, the Via Header cannot be used. In this case the FROM header is an option.

If the message is a non-encrypted SIP request, all fields are encrypted excluding the mandatory fields, as they are defined in the June 2002 version of RfC3261, which is incorporated herein by reference.

If the message is a non-encrypted SIP response, all fields are encrypted exclusively excluding the mandatory fields, as they are defined in RfC3261. After the encryption either a private header can be inserted (which indicates which parts of the message are encrypted) or even an identification characteristic for the key can be inserted which is only known to the involved parties and which permits the use of different keys for different communication partners. In addition, the reception channel 12 can conclude what kind of encryption was used due to the domain information in the non-encrypted header.

Then the message is routed to the reception channel 12 (step 3).

After the reception of the message on the receiving side 12 the private header field is analyzed, the private key which is corresponding to the used public key of the pair of keys 16 is downloaded, and the message is decrypted (step 4). Hereby the parameters which are relevant for billing and network interconnection can be extracted from the message and can be forwarded to a different entity 18 in the chain for subsequent processing (step 5). This can also contain real-time billing for pre-paid users.

Figure 4:
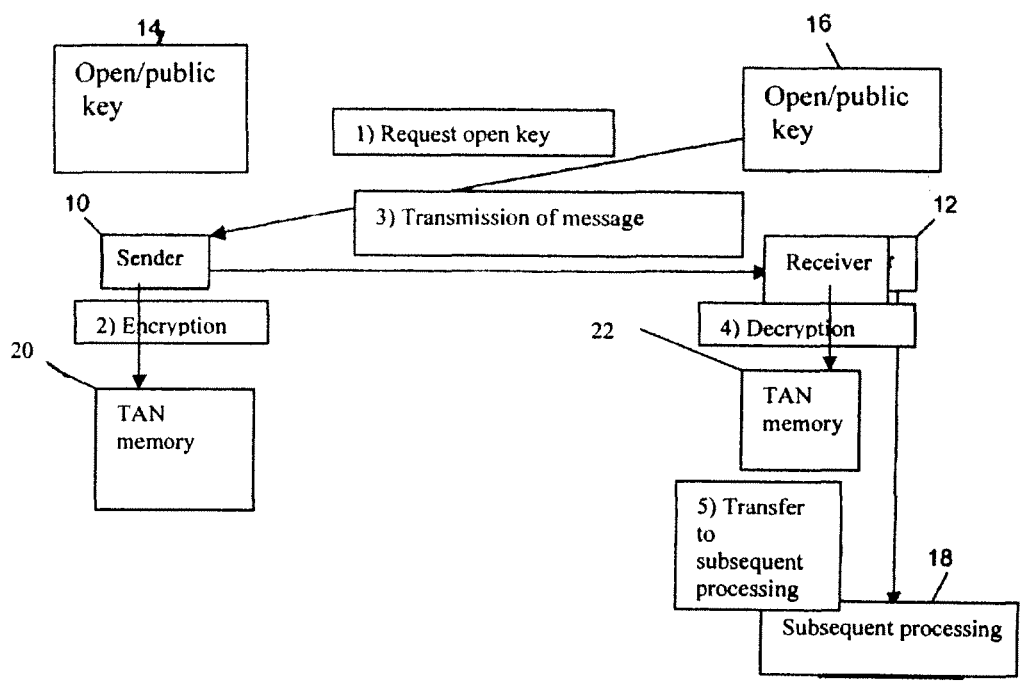
FIG. 4 shows the involved entities and the communication flow in the case of a mechanism that is based on transaction numbers of the method according to the invention.

FIG. 4 shows a transaction number based mechanism which is built of the basic mechanism. Therefore, the embodiments in FIG. 3 are applying the same way in FIG. 4. According to FIG. 4 both channels 10 and 12 provide the possibility to transmit sets of one-time transaction numbers (TAN) upon request. For example, the transaction numbers are available in data banks 20 and 22. Each set of transaction numbers belongs to a specific service class. Each TAN is correlated with a serial number. The reception channel 10 downloads a TAN set from the corresponding data bank 20. It is presumed that this method is adequately secured, for example, by SSL encryption, VPN based connections, etc.

For each transmitted message a TAN is selected according to the service class of the message. For example, by use of MD5 encryption a hash value can be produced and can (together with the serial number) be inserted either into a private header or into another part of the SIP message. For example, this could happen by replacing or enlarging the branch ID, insertion into the Via Header, or by something similar.

The reception channel extracts the TAN from the transmitted message, extracts the serial number from the TAN, and looks for the corresponding service class. Following that all relevant billing data is extracted from the message and transmitted to the entity 18 of the chain for subsequent processing.

Figure 5:
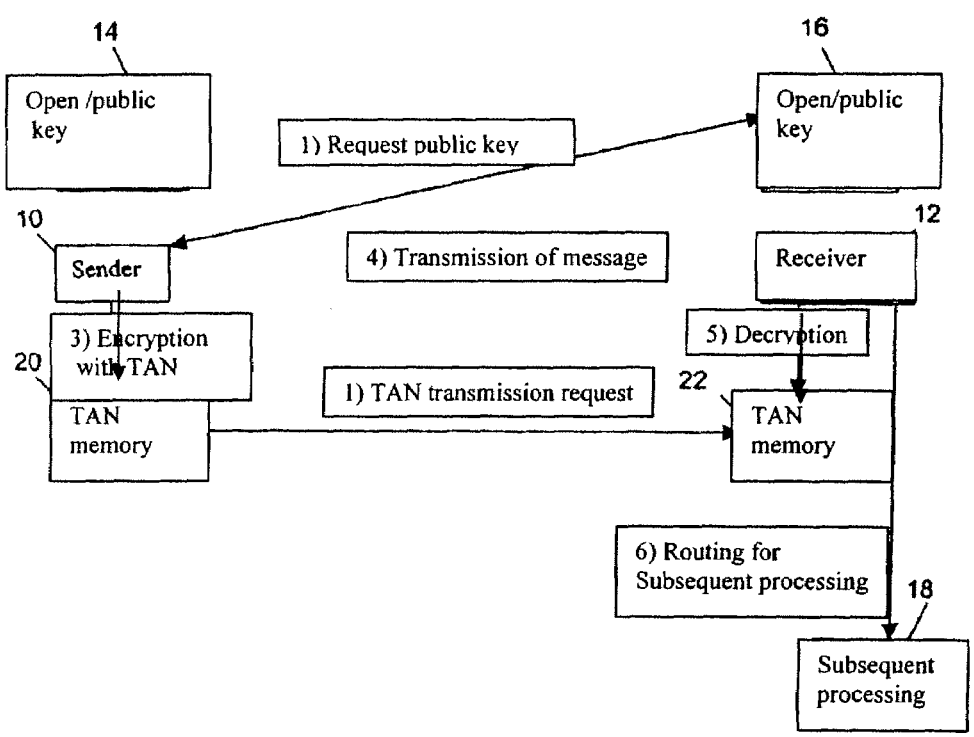
FIG. 5 shows the involved entities and the communication flow in the case of a fully authenticated mechanism of the method according to the invention.

FIG. 5 shows a fully authenticated mechanism which is built on the mechanism according to FIGS. 3 and 4.

The basic mechanism (FIG. 3), as well as the one based on TAN, are both covering all functions that are necessary for basic network interconnections. Despite of this for complex processes more information is needed. In this case the mechanisms can be enlarged by using specific transaction numbers.

The distribution of these specific TANs can take place by a number of mechanisms, for example, configured, downloaded, or automated by an external process, or it can be generated manually.

The initial conditions are just as in the basic mechanism. Before the key is used a TAN is selected and all data that is necessary for the business process (according to the prior negotiated interconnection contract) is added. Examples would be date, name of user, type of connection, billing category, etc.

Then the string is encrypted on the sending side 10 and it is sent.

For this process two alternatives are available:
 a. Insertion into a private header in the main part (body) of the SIP message which contains the encrypted string;
 b. Attaching the non-encrypted string to a non-encrypted part of the SIP header, for example, Via header, branch ID, or any other part of the SIP message that is not used for routing or for in-between located partial connections. The connected string is encrypted before sending.

The receiving side 12 can find out the encrypting methods by either a private header that is inserted before sending or by finding out the scheme. This is done based on the sending domain's 10 identity which is suggested by the information from the non-encrypted header.

After the encrypting method has been identified the string is decrypted and the information is routed to the entity for subsequent processing 18.

The use of fee identifiers (IMS charging identifier: ICID)

The mechanism can also comprise the use of ICIDs as they are described in 3GPP. For this a number of options are available:

Either the ICID is inserted into the string in front of the encryption or after it, as it is in the case of a fully authenticated mechanism. Additionally, the ICID can be used itself as TAN or it can be attached to a TAN.

With the described mechanism network operators are in the position to maintain the billing model "calling party pays" even in open networks, and at the same time they are able to use the SIP infrastructure of third-party providers. To attempt to address the problems of identification and authentication on the level of the providers would not solve the described problems, and also would not allow the use of the infrastructure of third-party providers. With the presented mechanism each operator can interconnect with any other operator via any network. If a public infrastructure is available, it can also be used.

The invention claimed is:

1. A method for securing internet protocol (IP) connections for the interconnection of a communication network of a first network operator with a communication network of at least one second network operator by using the Session Initiation Protocol (SIP), comprising: transmitting in encrypted form between the transmission server of the first network operator and the reception server of the second network operator at least parts of a SIP message having information needed for the billing of the connection thereby identifying and authenticating the transmission server and the reception server involved in the internet protocol connection, and encrypting only the parts of the message headers of the SIP message which are not used for routing and which are not mandatory; if the SIP message is a Request and is already encrypted by a mechanism that has an unsuitable protocol, then additionally encrypting one part of the message headers that is not already encrypted by such unsuitable protocol.

2. The method of claim 1, and for the encrypted transmission using an asymmetrical encryption method with a public key and a private key.

3. The method of claim 1, wherein the transmission server detects a public key which belongs to the reception server, the necessary information for billing is encrypted in this public key and is transmitted via SIP to the reception server, and the reception channel, with the help of a corresponding private key, decrypts and processes the information that has been encrypted with the public key.

4. The method of claim 1, and a receiving entity processing the private message header after the reception of the SIP message, and retrieving a corresponding private key to decrypt the message, extracting from the message the parameters contained therein that are relevant to billing, and forwarding the parameters to other entities for further processing.

5. The method of claim 1, wherein the unsuitable protocol is an S-MIME protocol.

6. The method of claim 1, wherein the SIP message is a SIP Request.

7. The method of claim 6, wherein the part of the message headers that is not already encrypted by such unsuitable protocol is a Via header part.

8. The method of claim 1, wherein the SIP message is a SIP response.

9. The method of claim 8, wherein the part of the message headers that is not already encrypted by such unsuitable protocol is a From header part.

10. A non-transitory machine readable medium carrying a data processing program with a program code for executing on a data processor a method for securing interact protocol (IP) connections for the interconnection of a communication network of a first network operator with a communication network of at least one second network operator by using the Session Initiation Protocol (SIP), said method comprising: transmitting in encrypted form between the transmission server of the first network operator and the reception server of the second network operator at least parts of a SW message having information needed for the billing of the connection thereby identifying and authenticating the transmission server and the reception server involved in the interact protocol connection, and encrypting only the parts of the message headers of the SIP message which are not used for routing and which are not mandatory; if the SIP message is a Request and is already encrypted by a mechanism that has an unsuitable protocol, then additionally encrypting one part of the message headers that is not already encrypted by such unsuitable protocol.

11. A data processing non-transitory machine readable program product which includes a program code, which is executable on a data processor, for the execution of a method for securing interact protocol (IP) connections for the interconnection of a communication network of a first network operator with a communication network of at least one second network operator by using the Session Initiation Protocol (SIP), said method comprising: transmitting in encrypted form between the transmission server of the first network operator and the reception server of the second network operator at least parts of a SIP message having information needed for the billing of the connection thereby identifying and authenticating the transmission server and the reception server involved in the interact protocol connection, and encrypting only the parts of the message headers of the SIP message which are not used for routing and which are not mandatory; if the SIP message is a Request and is already encrypted by a mechanism that has an unsuitable protocol, then additionally encrypting one part of the message headers that is not already encrypted by such unsuitable protocol.

12. A configuration comprised of at least one processing unit and one memory and including means for executing a method for securing interact protocol (IP) connections for the interconnection of a communication network of a first network operator with a communication network of at least one second network operator by using the Session Initiation Protocol (SIP) by transmitting in encrypted form between the transmission server of the first network operator and the reception server of the second network operator at least parts of a SIP message having information needed for the billing of the connection thereby identifying and authenticating the transmission server and the reception server involved in the internet protocol connection, and encrypting only the parts of the message headers of the SIP message which are not used for routing and which are not mandatory, wherein if the SIP message is a Request and is already encrypted by a mechanism that has an unsuitable protocol, then additionally encrypting one part of the message headers that is not already encrypted by such unsuitable protocol.

13. A method for securing internet protocol (IP) connections for the interconnection of a communication network of a first network operator with a communication network of at least one second network operator by using the Session Initiation Protocol (SIP), comprising: transmitting in encrypted form between the transmission server of the first network operator and the reception server of the second network operator at least parts of a SIP message having information needed for the billing of the connection thereby identifying and authenticating the transmission server and the reception server involved in the internet protocol connection, wherein if the SIP message is a non-encrypted SIP request, encrypting all fields with the exception of mandatory fields as they are defined in RfC3261 (June 2002); if the SIP message is a Request and is already encrypted by a mechanism that has an unsuitable protocol, then additionally encrypting one part of the message headers that is not already encrypted by such unsuitable protocol.

14. The method of claim 13, and for the encrypted transmission using an asymmetrical encryption method with a public key and a private key.

15. The method of claim 13, wherein the transmission server detects a public key which belongs to the reception server, the necessary information for billing is encrypted in this public key and is transmitted via SIP to the reception server, and the reception channel, with the help of a corresponding private key, decrypts and processes the information that has been encrypted with the public key.

16. The method of claim 13, and a receiving entity processing the private message header after the reception of the SIP message, and retrieving a corresponding private key to decrypt the message, extracting from the message the parameters contained therein that are relevant to billing, and forwarding the parameters to other entities for further processing.

17. The method of claim 13, wherein the unsuitable protocol is an S-MIME protocol.

18. The method of claim 13, wherein the SIP message is a SIP Request.

19. The method of claim 18, wherein the part of the message headers that is not already encrypted by such unsuitable protocol is a Via header part.

20. The method of claim 13, wherein the SIP message is a SIP response.

21. The method of claim 20, wherein the part of the message headers that is not already encrypted by such unsuitable protocol is a From header part.

22. A non-transitory machine readable medium carrying a data processing program with a program code for executing on a data processor a method for securing interact protocol (IP) connections for the interconnection of a communication network of a first network operator with a communication network of at least one second network operator by using the Session Initiation Protocol (SIP), said method comprising: transmitting in encrypted form between the transmission server of the first network operator and the reception server of the second network operator at least parts of a SIP message having information needed for the billing of the connection thereby identifying and authenticating the transmission server and the reception server involved in the internet protocol connection, and encrypting only the parts of the message headers of the SIP message which are not used for routing and which are not mandatory; if the SIP message is a Request and is already encrypted by a mechanism that has an unsuitable protocol, then additionally encrypting one part of the message headers that is not already encrypted by such unsuitable protocol.

23. A configuration comprised of at least one processing unit and one memory and including means for executing a method for securing internet protocol (IP) connections for the interconnection of a communication network of a first network operator with a communication network of at least one second network operator by using the Session Initiation Protocol (SIP) by transmitting in encrypted form between the transmission server of the first network operator and the reception server of the second network operator at least parts of a SIP message having information needed for the billing of the connection thereby identifying and authenticating the transmission server and the reception server involved in the internet protocol connection, and encrypting only the parts of the message headers of the SIP message which are not used for routing and which are not mandatory, wherein if the SIP message is a Request and is already encrypted by a mechanism that has an unsuitable protocol, then additionally enciypting one part of the message headers that is not already encrypted by such unsuitable protocol.

* * * * *

UNITED STATES PATENT AND TRADEMARK OFFICE
CERTIFICATE OF CORRECTION

| | | |
|---|---|---|
| PATENT NO. | : 9,002,748 B2 | Page 1 of 1 |
| APPLICATION NO. | : 12/302630 | |
| DATED | : April 7, 2015 | |
| INVENTOR(S) | : Matthias Britsch | |

It is certified that error appears in the above-identified patent and that said Letters Patent is hereby corrected as shown below:

In the Claims

Claim 10, Column 6, Line 44, delete "SW" and insert --SIP--

Claim 23, Column 8, Line 55, delete "enciypting" and insert --encrypting--

Signed and Sealed this
Eighteenth Day of August, 2015

Michelle K. Lee
*Director of the United States Patent and Trademark Office*